United States Patent
Helmecke et al.

(10) Patent No.: US 12,551,171 B2
(45) Date of Patent: Feb. 17, 2026

(54) CONTROLLING AN OBJECT TRANSPORT UNIT OF AN EXAMINATION SYSTEM BY MEANS OF A TOUCH-SENSITIVE SCREEN

(71) Applicant: Siemens Healthcare GmbH, Erlangen (DE)

(72) Inventors: Sven Helmecke, Nuremberg (DE); Bernd Kalnischkies, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 141 days.

(21) Appl. No.: 18/518,215

(22) Filed: Nov. 22, 2023

(65) Prior Publication Data

US 2024/0173002 A1     May 30, 2024

(30) Foreign Application Priority Data

Nov. 24, 2022    (EP) .................................. 22209318

(51) Int. Cl.
   *A61B 5/00*        (2006.01)
   *A61B 5/055*      (2006.01)
   *G01R 33/30*      (2006.01)

(52) U.S. Cl.
   CPC ............ *A61B 5/7475* (2013.01); *A61B 5/055* (2013.01); *A61B 5/7435* (2013.01); *G01R 33/30* (2013.01)

(58) Field of Classification Search
None
See application file for complete search history.

(56) References Cited

U.S. PATENT DOCUMENTS

| | | | | |
|---|---|---|---|---|
| 9,174,131 | B2* | 11/2015 | Shirasaka | A63F 13/822 |
| 9,462,981 | B2* | 10/2016 | Padwa | A61B 6/0492 |
| 11,285,380 | B2* | 3/2022 | Miao | A63F 13/23 |
| 2003/0004409 | A1 | 1/2003 | Mueller et al. | |
| 2014/0155728 | A1* | 6/2014 | Lee | A61B 5/7445 |
| | | | | 600/407 |
| 2015/0201891 | A1* | 7/2015 | Padwa | A61B 6/467 |
| | | | | 600/425 |
| 2019/0133538 | A1 | 5/2019 | Bourne et al. | |

(Continued)

FOREIGN PATENT DOCUMENTS

| | | | | |
|---|---|---|---|---|
| CN | 104461345 | * | 2/2015 | |
| CN | 114533093 A | * | 5/2022 | H04N 23/50 |

(Continued)

OTHER PUBLICATIONS

EN 50325-4, Industrial Communication Subsystem Based on ISO 11898 (CAN), Jul. 2003.

(Continued)

*Primary Examiner* — Rodney E Fuller
(74) *Attorney, Agent, or Firm* — Banner & Witcoff, Ltd.

(57) ABSTRACT

An examination system is provided having an object transport unit for transporting an object to be examined into an examination region. A touch-sensitive screen is used that is configured to control a function and/or for visualizing a state of the examination unit, which may comprise a magnetic resonance tomography (MRT) system. The touch-sensitive screen has a virtual operating element, which is able to be brought into a movement, a deflection, or a target position. Dependent thereon, the object transport unit is moved toward or away from the examination region.

18 Claims, 2 Drawing Sheets

(56) References Cited

U.S. PATENT DOCUMENTS

2020/0310543 A1* 10/2020 Kirisken ................. G06F 3/016
2020/0393527 A1   12/2020 Biber et al.

FOREIGN PATENT DOCUMENTS

DE      202022104969 U1   10/2022
EP           3479875 A1 *  5/2019  ............. A61B 6/462

OTHER PUBLICATIONS

Anonym: "MAGNETOM Skyra fit Operator Manual—MR System syngo MR E11", Online, 2015, pp. 1-131, XP093038307, Internet, Gefunden im Internet: URL:https://www.manualslib.com/manual/1457465/Siemens-Magnetom-Skyra-Fit.html#product-MAGNETOM%20Skyra%20fit [gefunden am Apr. 11, 2023].

* cited by examiner

CONTROLLING AN OBJECT TRANSPORT UNIT OF AN EXAMINATION SYSTEM BY MEANS OF A TOUCH-SENSITIVE SCREEN

CROSS-REFERENCE TO RELATED APPLICATIONS

The present application claims priority to and the benefit of European patent application no. EP 22209318.9, filed on Nov. 24, 2022, the contents of which are incorporated herein by reference in their entirety.

TECHNICAL FIELD

The present disclosure relates to an examination system with an examination unit, having an examination region, an object transport unit with which an object to be examined is able to be transported into and/or out of the examination region, and a touch screen which is configured for controlling a function and/or for visualizing a state of the examination unit. The present disclosure further relates to a corresponding method for operating an examination system.

BACKGROUND

Apparatuses for magnetic resonance tomography (MRT) are imaging apparatuses that use a strong external magnetic field to orient the nuclear spins of an object to be examined and, by applying a radio frequency (RF) excitation pulse, excite them into precession about the relevant orientation. The precession or the transition of the spin from this excited state into a state with lower energy generates an alternating electromagnetic field, which can be detected via receiving antennas as an MR signal.

With the aid of magnetic gradient fields, a position encoding can be impressed upon the signals, which subsequently permits the received signal to be associated with a volume element of the examination object. The received signal can then be evaluated, for example, to prepare an image representation of the examination object.

In magnetic resonance tomography (MRT) systems, it is required to position the anatomy to be represented in the center of the magnet in order to ensure a sufficiently good image quality. The reason for this lies in the fact that, for example, the homogeneity of the magnetic field, the linearity of the gradient system, and the linearity of the radio frequency field emitted in this region is favorable for the imaging.

The definition of the anatomical region that is subsequently displaced for generating the image data into the so-called isocenter of the magnet is typically undertaken manually by the user. The operation of the patient support on which the patient is placed is possible with, inter alia, an adjusting wheel. This adjusting wheel is disadvantageous with regard to cleaning capability. In addition, the adjusting wheel contributes to the operating costs of the system. Furthermore, the adjusting wheel typically requires an opening through the magnetic covering of the MRT system.

In principle, not only human and animal patients can be examined with MRT systems. Rather, MRT systems can also be used to examine non-living objects such as impeller wheels of turbines and other objects. Such examination objects are referred to hereinafter simply as objects.

SUMMARY

The object of the present disclosure lies in finding an examination system that has an operating element, which is advantageous with regard to hygiene and costs, for controlling an object transport unit. According to the disclosure, this object is achieved via an examination system and a method according to the embodiments as described herein, including the claims.

According to the present disclosure, an examination system is provided with an examination unit having an examination region. The examination system is configured, in general, to examine an object. The object can be, for example, a human patient or a technical object. The form of the examination can be as desired. For example, optical or acoustic radiation can be utilized for contact-free examination. For this purpose, the examination system may have a special examination unit, which itself has a separate examination region. The object to be examined is placed in the examination region of the examination unit to achieve an examination.

For this purpose, the examination system has an object transport unit with which the object to be examined can be transported into and/or out of the examination region. The object transport unit can have, for example, a conveyor belt with a receptacle for the object. If the object is a patient, the object transport unit can have a patient support with which the patient can be transported in a defined manner into the examination region. Typically, it is also possible with the object transport unit or with the patient support to transport the patient out of the examination region again.

In addition, the examination system comprises a touch-sensitive screen, which may be implemented as a touchscreen or a touch panel. This touch-sensitive screen is configured to control a function and/or visualize a state of the examination unit. The touch-sensitive screen may represent an interface with the manual control system of the examination unit. For example, with the aid of the touch-sensitive screen, certain functions of the examination unit can be activated or deactivated. For this purpose, for example, suitable virtual operating elements are to be touched on the touch-sensitive screen. For example, with the aid of the touch-sensitive screen, lighting elements of the examination unit can be switched on and off. If suitable, comfort-related functions such as ventilation in an MRT system can be switched on and off with the aid of the touch-sensitive screen. The touch-sensitive screen can additionally or alternatively be used for visualizing one or more states of the examination unit. For example, error messages of the examination unit or ECG data of the patient can be represented optically on the touch-sensitive screen. Similarly, the positions of local coils can be shown graphically on the touch-sensitive screen or workflows can be controlled manually by means of the touch-sensitive screen, and their current states can be represented.

According to the disclosure, the touch-sensitive screen has a virtual operating element, which is able to be brought manually into a movement, a deflection, or a target position. Thus, the virtual operating element is shown on the touch-sensitive screen and can be displaced, for example, with an index finger. This displacement can lead to a specific (e.g. respectively predefined) movement, a specific target position, or a specific deflection. The screen itself or the attached sensor system can register one or more parameters of this movement, target position, or deflection. Thus, for example, a speed of the movement or an amplitude of the deflection or an actual location, i.e. target position of the virtual operating element, can be registered. Alternatively, just one target position can be registered, to which the virtual operating element has been displaced, without needing to know the starting and target position as for a deflection.

Furthermore, in the examination system according to the disclosure, the object transport unit is able to be moved according to the movement, deflection, or target position of the virtual operating element, toward or away from the examination region. This means that at least a part of the object transport unit is moved, according to the operation of the virtual operating element, into or out of the examination region. In the case of a patient support, as the object transport unit, the actual support moves into the examination region, but not the foot or the drive of the overall patient table. Similarly, a receptacle in which the technical object to be examined is received moves into the examination region by means of a conveyor belt or a linear motor. In this case, it is also not the entire transport unit including the conveyor belt or linear motor that moves into the examination region, rather at most a portion thereof.

In an advantageous manner, it is thereby possible that the object transport unit is manually controlled by means of the touch-sensitive screen. Apart from the touch-sensitive screen, therefore, no additional control element, such as an adjusting wheel, is needed to move the object transport unit at least partially into the examination region. By this means, an additional operating element such as the adjusting wheel can be dispensed with, so that the production costs of the examination system are reduced. It is to be regarded as a particular advantage that the touch-sensitive screen serves not only for status indications or control operations of the examination unit, but also for controlling the object transport unit (e.g. via the patient table).

In one exemplary embodiment, it is provided that the virtual operating element is implemented as a graphic element that is exclusively able to be deflected linearly from a starting position. Starting from the starting position, the linear deflection can take place in one direction, and possibly also in the opposite direction. For example, the operating element can thus be realized as a virtual sliding controller. Therein, the virtual operating element can be displaced or deflected, for example, by means of the finger on the touch-sensitive screen. If relevant, a maximum deflection in one or both directions can be provided, wherein this is preferably also recognizably indicated on the touch-sensitive screen. However, "exclusively linearly" can also mean that a plurality of linear movement possibilities in different directions are joined to one another. For example, a linear portion can be oriented vertically, and a second portion added thereto can be oriented horizontally. Thus, a patient support of an MRT system can initially be moved, with the aid of the virtual operating element, upwardly into the entry position and subsequently horizontally into the MRT patient tunnel. These two movements with movement directions differing by 90 degrees, can be carried out automatically by the object transport unit or the patient support if the virtual operating element is moved linearly in only one direction from the starting position. In this case, the movement outwards of the virtual operating element indeed means for example the automatic lifting of the patient support as far as the entry position and the further horizontal movement in the direction of the MRT patient tunnel. The deflection of the virtual operating element from the starting position in the opposite direction can then mean, for example, the movement of the patient support out from the MRT patient tunnel, and possibly the automatic further movement of the patient support downwardly into a comfortable dismounting position.

In an alternative exemplary embodiment, the virtual operating element is implemented as a graphics element that is exclusively able to be deflected rotatably from a starting position. An operating element that is rotatably deflectable or rotatable in this way emulates the known adjusting wheel graphically and in relation to the mode of operation. For this purpose, on the touch-sensitive screen, a virtual adjusting wheel can be represented. A virtual adjusting wheel of this type can be rotated, for example, with a finger clockwise and counterclockwise. Herein, also a maximum rotation can be provided in each direction. The rotational deflection of the virtual adjusting wheel is evaluated or converted by a control system or the object transport unit of the examination system as a movement command in the corresponding direction. Herein, similar movement patterns can also be realized as in the linear displacement of the operating element. For instance, the rotation of the virtual adjusting wheel can also have the result that the object transport unit or the patient support carries out two coupled movements automatically one after the other, such as for example, a partial movement upwardly and a partial movement to the left or the right.

In a further exemplary embodiment, it is provided that a velocity of the object transport unit depends upon a degree of the deflection of the virtual operating element. This means, for example, that the velocity of the object transport unit increases when the virtual operating unit is further deflected from the starting position. In other words, the stronger the deflection is, the greater is the velocity of the object transport unit. This applies not only for linear, but also for rotational deflections. The velocity can have, for example, a linear relation to the degree of the deflection. If relevant, however, there can also be other functional relations between the deflection and the velocity, for example a quadratic or exponential relation. In an embodiment, both a forward and a reverse movement of the object transport unit with a different velocity can be realized in that the virtual operating element is deflected correspondingly far into one direction or into the other, opposite direction.

Furthermore, an exemplary embodiment can be provided in which the virtual operating element returns automatically from a deflection into the starting position when the virtual operating element is no longer touched manually. This means that the virtual operating element is effectively moved back into the starting position by a return spring when it is no longer "held" manually. This has the advantage that the virtual operating element only moves, for example, if the virtual operating element is deliberately deflected. The return of the virtual operating element can take place suddenly or with a gentle transition in which the velocity of the object transport unit gradually decreases to zero. In this way, for example, it can be achieved automatically that a patient support of an MRT system stops when, for example, the operating person is no longer touching the touch-sensitive screen or the virtual operating element.

In an exemplary embodiment, the touch-sensitive screen is mounted directly on the examination unit. For example, in an MRT system, the touch-sensitive screen can be mounted in the entry region of the tube, i.e. on the housing of the magnet system. Therein, the touch-sensitive screen can be connected separably or inseparably to the examination unit. The inseparable connection has the advantage that the touch-sensitive screen is always reachable at a fixed site. However, the separable connection to the examination unit can offer the advantage that the object transport unit can be remotely controlled by way of the touch-sensitive screen. For this purpose, the touch-sensitive screen may e.g. be connected by way of a wireless data connection to the examination unit or the object transport unit. For example, corresponding Bluetooth or WLAN connections are suitable for this.

The examination system can advantageously be an imaging examination system. The imaging examination system therein has an examination system of the type described above, wherein the examination unit is configured to obtain an image from the object to be examined in the examination region. Such imaging examination systems as discussed herein may comprise, for example, MRT systems, CT (computed tomography) systems, angiography systems, etc. With the virtual operating element on the touch-sensitive screen, it is then possible to move the object to be examined into the examination region, wherein no additional adjusting wheel is required in addition to the touch-sensitive screen.

The objects outlined above may also be achieved according to the disclosure with a method for operating an examination system of the above type, wherein the virtual operating element of the touch-sensitive screen is brought manually into a movement, a target position, or a deflection, and the object transport unit is moved according to the movement, target position, or deflection of the virtual operating element, to or away from the examination region, as the case may be. The manual operation of the virtual operating element on the touch-sensitive screen can take place, for example, by means of a finger of an operating person. Alternatively, the manual operation can, for example, also be carried out with the use of a stylus or some other aid.

The advantages and embodiment variants as set out above in relation to the examination system also apply similarly to the method according to the disclosure. Accordingly, the functional features of the examination system can be regarded as corresponding method features.

For application cases or application situations, which can result with the method and which are not explicitly described here, it can be provided that according to the method, an error message and/or a request for input of a user feedback is output and/or a standard setting and/or a predetermined initial state is set.

BRIEF DESCRIPTION OF THE DRAWINGS

The present disclosure will now be described in greater detail making reference to the accompanying drawings, in which.

The exemplary embodiments set out in greater detail below, making reference to the drawings, represent example embodiments of the present disclosure.

DETAILED DESCRIPTION OF THE DISCLOSURE

Figure 1:
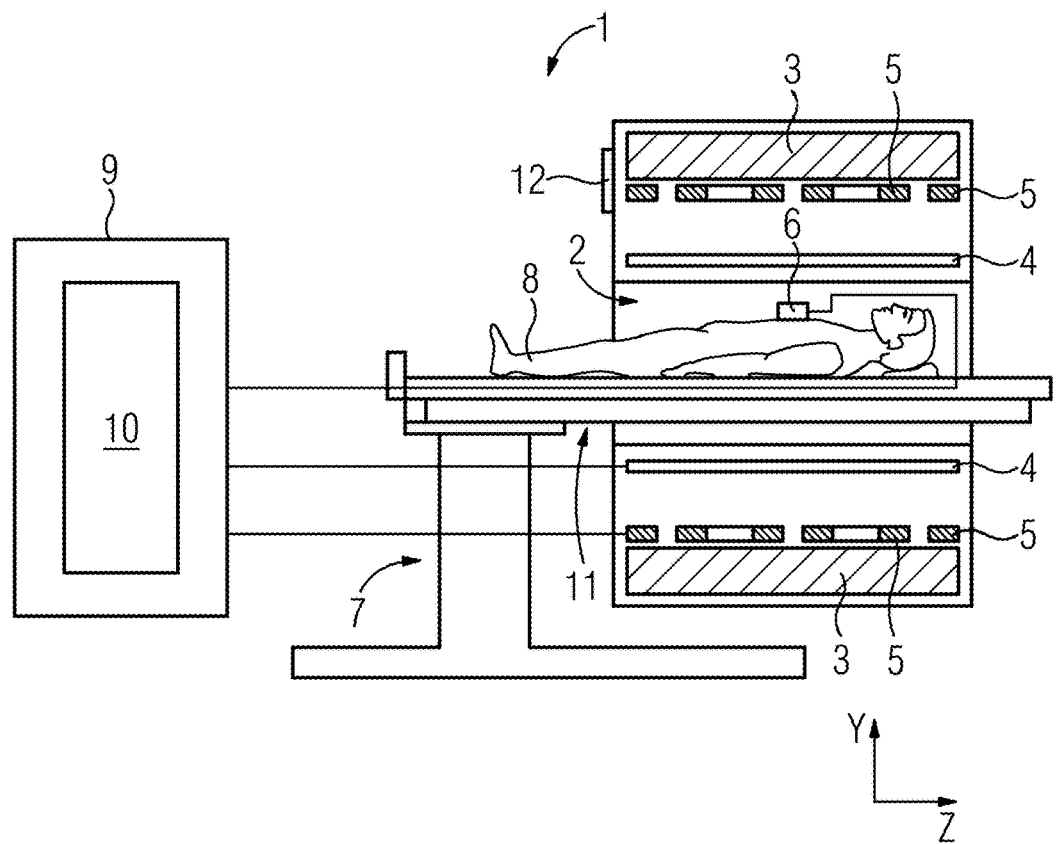
FIG. 1 illustrates a schematic view of an example examination system according to one or more embodiments of the present disclosure.

FIG. 1 illustrates a schematic representation of an example examination system according to one or more embodiments of the present disclosure, which comprises an exemplary MRT system 1.

The MRT system 1 comprises a magnet unit with a field magnet 3, which generates a static magnetic field for orienting nuclear spins of an object 8, for example a patient, in an imaging region. The imaging region or examination region is characterized by an extremely homogeneous static magnetic field, wherein the homogeneity relates, for instance, to the magnetic field strength or its amplitude. The imaging region is situated in a patient tunnel 2, which extends in a longitudinal direction Z through the magnet unit. The field magnet 3 can be, for example, a superconducting magnet that is configured to generate magnetic fields with a magnetic flux density of up to 3 T or more. For lower field strengths, however, permanent magnets or electromagnets with normally-conducting coils can also be used. An object transport unit configured here as a patient table 7 has a patient support 11, which can be moved into the patient tunnel 2 to transport the part of the patient (or other object) to be examined into the examination region within the patient tunnel 2.

The examination system or the MRT system 1 has a touch-sensitive screen 12 (e.g. a touchscreen or touch panel) for example on the cover of the magnetic unit, for instance at the entry to the patient tunnel. This touch-sensitive screen 12 is configured to represent status data of the examination system. Accordingly, it can be visualized, for example, whether an illumination system or a ventilation system in the patient tunnel 2 is switched on. Otherwise, data relevant to the examination can be represented on the touch-sensitive screen 12. The touch-sensitive screen 12 can receive such data, for example, from a control and computing system 9. In addition, the touch-sensitive screen 12 can, where relevant, also represent workflow data, which it also receives from the control and computing system 9. In an embodiment, there exists a bidirectional data connection to the control and computing system 9 such that, with the aid of the touch-sensitive screen 12, control commands for the examination system can be input manually.

The examination unit as discussed herein may include any suitable combination of components identified with the MRT system 1 (or other suitable system) in which the touch-sensitive screen 12 is implemented and which may perform any suitable number and/or type of operations in accordance with a respective imaging scan. This may include, with respect to the MRT system 1 as shown in FIG. 1, for example, any combination of the field magnet 3, the body coil 4, the gradient coil arrangement 5, the local coil 6, the patient table 7, the control and computing system 9, the transmitting-receiving control unit 10, the patient support 11, etc.

In addition, the touch-sensitive screen 12 has a data connection to the object transport unit, which is implemented here as the patient table 7. This data connection can be wire-bound or wireless. By way of this connection, it is possible to control movements of an object receptacle (herein, the patient support 11) of the patient table 7 with the touch-sensitive screen. This results in a double functionality of the touch-sensitive screen, specifically functions in relation to the examination unit and the object transport unit.

Furthermore, the magnet unit comprises a gradient coil arrangement 5 with a plurality of gradient coils, which serve to overlay gradient fields, i.e. position-dependent magnetic fields, in the three spatial directions for spatial differentiation of the scanned image regions in the imaging region upon the static magnetic field. The gradient coils of the gradient coil arrangement 5 can be configured, for example, as normally conducting wires that can generate fields or field gradients that are, for example, orthogonal to one another in the imaging region.

The magnet unit comprises a transmitting coil arrangement which can comprise, for example, a body coil 4 as the transmitting antenna, which is configured to radiate a radio frequency signal into the imaging region. The body coil 4 can therefore be understood to be an RF transmitting coil arrangement of the MRT system 1, or as part of the RF transmitting coil arrangement. The body coil 4 can also be used in some embodiments to receive resonant MR signals that are emitted by the object 8. In this case, the body coil 4 can also be considered to be part of a signal acquisition apparatus of the MRT system 1. Optionally, the signal acquisition apparatus is a local coil 6, which can be arranged in the immediate vicinity of the object 8, for example, on the object 8, or in the patient table 7. The local coil 6 can serve, alternatively or in addition to the body coil 4, as a receiving coil or receiving antenna.

The MRT system 1 also comprises a control and computing system 9. The control and computing system 9 can comprise a transmitting-receiving control unit 10, which is connected to the body coil 4, the gradient coil arrangement 5, and/or the local coil 6. Dependent upon the acquired MR signals, the transmitting-receiving control unit 10, which can comprise an analog-to-digital converter (ADC), can generate corresponding MR data, e.g. in k-space. The transmitting-receiving control unit 10 may also be connected to the body coil 4 and controls the body coil 4 to generate RF pulses, such as excitation pulses and/or refocusing pulses. Furthermore, the transmitting-receiving control unit 10 of the control and computing system 9 can be connected to the gradient coil arrangement 5 and control the gradient coil arrangement 5 to switch slice selection gradients, gradients for the frequency, and/or phase encoding and/or readout gradients.

The control and computing system 9 can evaluate the MR data and, for example, undertake an image reconstruction or parts thereof or other computation tasks that are needed in the process of the imaging. A digital signal processing facility can be part of the transmitting-receiving control unit 10 and thus also part of the examination system (herein the MRT system 1).

It should be noted that the structure of the control and computing system 9 as shown in FIG. 1 is provided by way of example and not limitation. The different required tasks and/or functions can also be distributed differently and/or to different control units and/or other computing units.

The MRT system 1 may be configured, for example, of carrying out a method according to the disclosure for operating an examination system, as further discussed herein.

As indicated above, it is important to transport the region of an object or patient to be examined into the spatially delimited examination region of the examination system. In this regard, the definition of the anatomical region that is subsequently displaced for generating the image data into the so-called isocenter (examination region) of the magnet (in the case of an MRT system) is typically carried out manually by the user. This means, for example, that the patient is displaced more or less far into the patient tunnel 2.

As noted above, the operation of the patient table 7 for moving the patient support 11 thereof is typically carried out, in an example that is not claimed here, with an adjusting wheel. An adjusting wheel of this type is however, is very disadvantageous for reasons of cleaning capability. In addition, the adjusting wheel contributes to the manufacturing and operating costs of the system. By omitting the adjusting wheel, both hygiene and cost aspects can be optimized.

In order to solve this problem, the touch-sensitive screen mentioned above can be made available as an operating interface. Thereby, for example in an MRT system, the patient support can be displaced by means of a touch-sensitive screen. This means that the touch-sensitive screen offers the possibility, apart from various other non-support-related functions, of sending the patient support 11 to, for example, one or more predefined target positions. This type of support movement is also known as a Target Table Move. In contrast thereto, the adjusting wheel as mentioned above offers the possibility of moving the patient support 11 for as long as the adjusting wheel is deflected in one or the other direction until the desired end position is reached. This type of support movement is known as a Continuous Table Move. According to the disclosure, a Continuous Table Move operation is also realized with the touch-sensitive screen as described in further detail herein.

Figure 2:
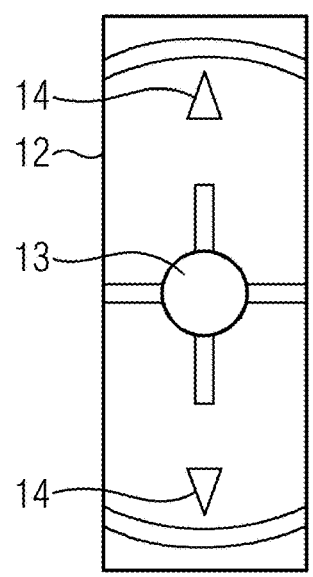
FIG. 2 illustrates an example touch-sensitive screen with a virtual operating element according to one or more embodiments of the present disclosure.

Due to the free programming capacity, the touch-sensitive screen offers the possibility of integrating further touch-sensitive surfaces, switches, or virtual operating elements. For example, a virtual operating element 13 similar to a sliding regulator can be implemented on the touch-sensitive screen 12, as shown in FIG. 2. Arrows 14 on the touch-sensitive screen 12 can indicate which direction the virtual operating element 13 can be moved. In the present example, the virtual operating element 13 should be able to be slid upwardly or downwardly. This does not preclude, however, that the virtual operating element 13 can also be displaced leftwardly and/or rightwardly if, for example, the patient support is also able to be moved in the X-direction, i.e. horizontally transversely to the longitudinal direction of the patient tunnel 2.

Figure 3:
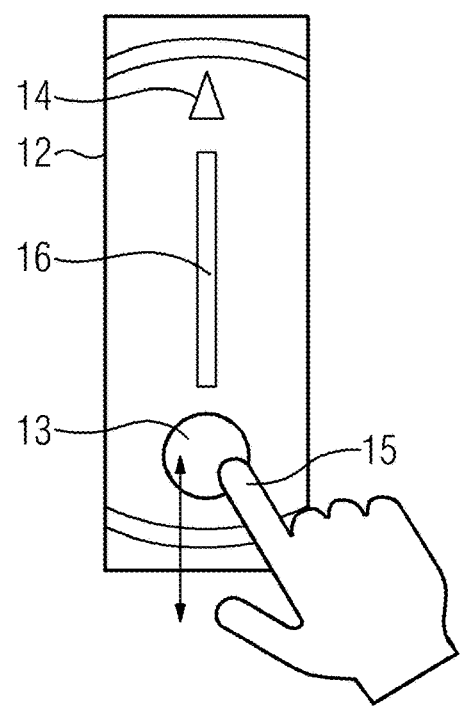
FIG. 3 illustrates an example manual deflection of the virtual operating element according to one or more embodiments of the present disclosure.

FIG. 3 indicates how the virtual operating element 13 can be displaced manually. For this purpose, the finger 15 for example touches the virtual operating element 13 on the touch-sensitive screen 12 and guides it downwardly, for example as shown in FIG. 3, with continued touching of the touch-sensitive screen 12. Thereby, the control command could be generated in that the patient support 11 moves out of the patient tunnel 2. Conversely, with a movement upwardly of the virtual operating element 13, the command could be generated that the patient support 11 is to be moved into the patient tunnel 2. The virtual operating element 13 can thus be displaced from a starting position 16, whereby the so-called Continuous Table Move is triggered. Optionally, this manually controlled movement can be terminated if the virtual operating element 13 is no longer touched. In this event, the patient table 7 also receives no more corresponding movement commands.

In a further development, it can be provided that via the deflection of the virtual operating element 13, the displacement velocity of the object transport unit or the patient support 11, can be altered. If the virtual operating element 13 is pulled, for example, far downwardly, the patient support is correspondingly moved at a high speed, for example, out of the patient tunnel. By contrast therewith, the velocity during outward travel can be correspondingly lower if the virtual operating element 13 is moved only slightly downwardly from the starting position 16. A similar principle applies for corresponding deflections or deflection amplitudes upwardly.

In an embodiment, it is provided that the patient support, on moving into the patient tunnel 2, is initially moved upwardly (i.e. the height or Y-direction) as far as a predefined entry height and subsequently horizontally (i.e. in the length or the Z-direction) into the patient tunnel 2. This can be programmed in the patient table 7 as a coherent overall movement. Accordingly, such a combined Y-Z movement can also be triggered by a single deflection of the virtual operating element 13 from the starting position 16, for example, upwardly. This means that when the operator holds the virtual operating element 13 unchangingly above the starting position 16, the patient support 11 moves firstly upwardly in the Y-direction and, upon reaching the entry height, automatically moves further into the patient tunnel 2 in the Z-direction. Alternatively, a combined movement of this type can also be achieved, for example, by way of a combined guidance of the virtual operating element 13 e.g. upwardly and subsequently to the right. Therein, the virtual operating element 13 can optionally return back to the starting position 16 when the first movement in the Y-direction is ended, although this is not necessarily required.

By way of the possibility of actuating the Continuous Table Move support movements with the touch-sensitive screen 12, an adjusting wheel can be dispensed. By this means, numerous advantages are achieved. Firstly, a cost savings can be achieved since the adjusting wheel as such, including the required infrastructure such as cables, bus-connections, and voltage supply, is not needed. Under some circumstances, in a system which, for example, had up to three adjusting wheels for different operating locations, a correspondingly greater amount of cost savings can be achieved.

A further significant advantage lies therein that in an MRT system, the magnetic covering can be substantially simplified, since no feedthrough for the adjusting wheel is needed. Through the simplified design of the magnetic covering, costs can also be saved.

A further advantage lies therein that, due to the omission of one or more adjusting wheels, production time can be saved. In addition, there are advantages with regard to hygiene, since adjusting wheels are significantly more difficult to clean than flat surfaces.

The control via the touch-sensitive screen also incidentally enables the possibility of additionally initiating the Continuous Table Move support movement from a remote system. From the remote system, the deflection of the virtual operating element is then effectively simulated to generate the corresponding control command.

The possibility also exists that the touch-sensitive screen reproduces an extended display of an operating computer, which is arranged in a preparation room of the examination system. In this case, the control of the object transport unit or of the patient table can take place directly from the operating computer from or via the touch-sensitive screen.

Figure 4:
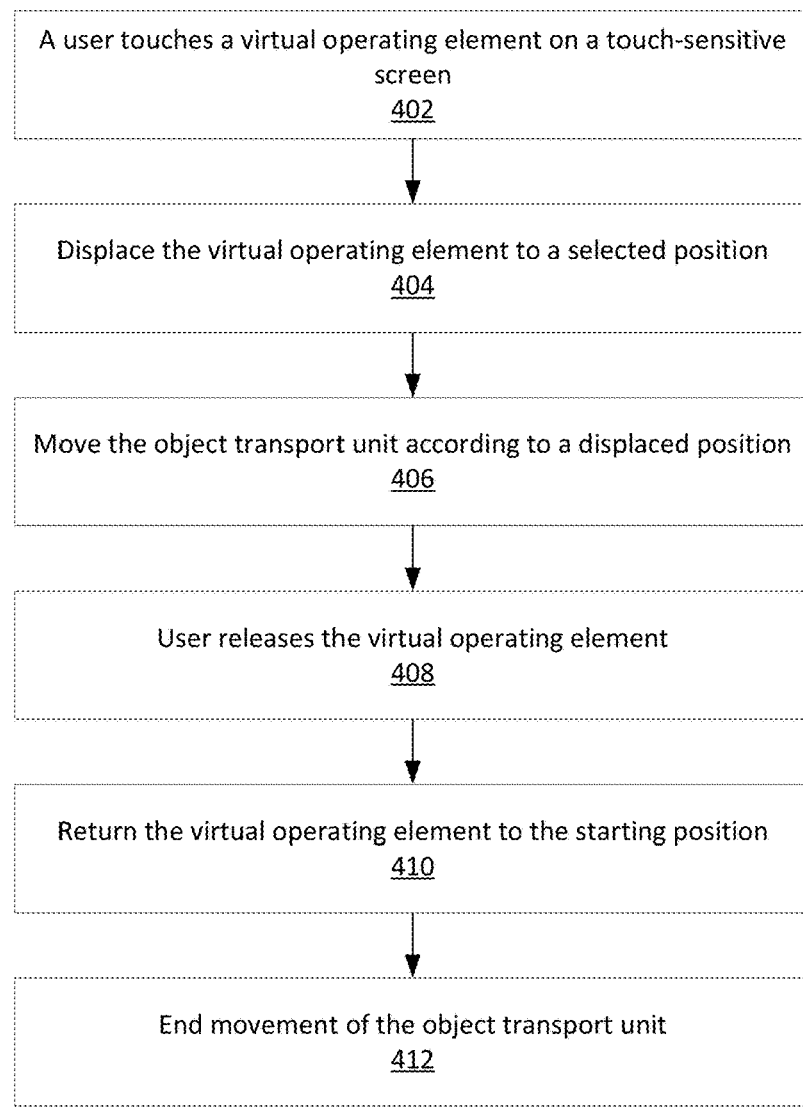
FIG. 4 illustrates an example flow diagram according to one or more embodiments of the present disclosure.

FIG. 4 illustrates an example flow diagram 400 according to one or more embodiments of the present disclosure. In a first block 402, a user touches a virtual operating element on the touch-sensitive screen, for example with a finger. The touch-sensitive screen registers such a touch.

In a subsequent block 404, the virtual operating element is displaced to a selected position. The operator therein pulls the virtual operating element to the desired position.

In a block 406, the object transport unit is moved according to the displaced position. This means that it is automatically detected in which direction the virtual operating element has been deflected from the starting position. If relevant, the distance between the deflected position and the starting position is also determined to, independently therefrom, control the velocity of the object transport unit. The direction of the transport of the object transport unit can also be controlled with the direction of the deflection on the touch-sensitive screen.

At the end of the desired movement, the operator releases the virtual operating element on the touch-sensitive screen in accordance with block 408. This means that the operator no longer touches the virtual operating element and removes his finger from the screen.

The releasing of the virtual operating element in accordance with block 408 is registered by the touch-sensitive screen and thereupon the virtual operating element optionally returns into the starting position in accordance with block 410.

At the same time as the releasing in accordance with block 408 or, depending upon the movement of the operating element, back again into the starting position in accordance with block 410, according to block 412, an ending of the movement of the object transport unit takes place. This ending can take place abruptly in response to the releasing of the virtual operating unit, or by way of a continuous predetermined reduction of the velocity.

The various components described herein may be referred to as "units," or "systems." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units and/or systems, as applicable and relevant, may alternatively be referred to herein as "circuitry," "controllers," "processors," or "processing circuitry," or alternatively as noted herein.

What is claimed is:

1. An examination system, comprising:
    an examination unit including an examination region;
    an object transport unit configured to transport an object to be examined into and/or out of the examination region; and
    a touch-sensitive screen configured to control a function and/or to visualize a state of the examination unit,
    wherein the touch-sensitive screen comprises a virtual operating element that is able to be manually displaced via a deflection of the virtual operating element in which the virtual operating element is physically moved from a starting position to a deflected position that is different than the starting position,
    wherein the object transport unit is configured to be moved toward or away from the examination region in accordance with the displacement of the virtual operating element, and
    wherein a velocity of the object transport unit depends upon a linear function of a degree of the deflection of the virtual operating element.

2. The examination system as claimed in claim 1, wherein the virtual operating element is configured to be manually displaced from the starting position exclusively via a linear deflection.

3. The examination system as claimed in claim 1, wherein the virtual operating element returns automatically to the starting position after being deflected upon the virtual operating element being no longer touched.

4. The examination system as claimed in claim 1, wherein the touch-sensitive screen is mounted directly on the examination unit.

5. The examination system as claimed in claim 1, wherein the examination system comprises a magnetic resonance tomography (MRT) system.

6. The examination system as claimed in claim 1, wherein the examination unit is configured to obtain an image from the object to be examined in the examination region.

7. The examination system as claimed in claim 1, wherein the manual displacement of the virtual operating element comprises a first deflection of the virtual operating element in a first direction and a second deflection of the virtual operating element in a second direction.

8. The examination system as claimed in claim 7, wherein the first direction and the second direction are 90 degrees with respect to one another.

9. The examination system as claimed in claim 7, wherein the first deflection and the second deflection of the virtual operating element causes the object transport unit to move upwardly to an entry position to the examination region and then subsequently horizontally into the examination region.

10. The examination system as claimed in claim 1, wherein the manual displacement of the virtual operating element comprises a deflection of the virtual operating element in single direction.

11. The examination system as claimed in claim 10, wherein the deflection of the virtual operating element causes the object transport unit to move upwardly to an entry position to the examination region and then subsequently horizontally into the examination region.

12. The examination system as claimed in claim 1, wherein the manual displacement of the virtual operating element comprises a first deflection of the virtual operating element in a first direction and a second deflection of the virtual operating element in a second direction that is opposite to the first direction.

13. The examination system as claimed in claim 12, wherein:
 the manual displacement of the virtual operating element in the first direction causes the object transport unit to move horizontally into the examination region at a first velocity,
 the manual displacement of the virtual operating element in the second direction causes the object transport unit to move horizontally into the examination region at a second velocity, and
 the first velocity and the second are different than one another.

14. A computer-implemented method for operating an examination system, comprising:
 transporting, via an object transport unit, an object to be examined into and/or out of an examination region of an examination unit associated with the examination system;
 controlling, via a touch-sensitive screen, a function of the examination unit and/or visualizing, via the touch-sensitive screen, a state of the examination unit,
 wherein the touch-sensitive screen comprises a virtual operating element that is able to be manually displaced via a deflection of the virtual operating element in which the virtual operating element is physically moved from a starting position to a deflected position that is different than the starting position; and
 moving the object transport unit toward or away from the examination region in accordance with the displacement of the virtual operating element,
 wherein a velocity of the object transport unit depends upon a linear function of a degree of the deflection of the virtual operating element.

15. The computer-implemented method as claimed in claim 14, further comprising:
 manually displacing the virtual operating element from the starting position exclusively via a linear deflection.

16. The computer-implemented method as claimed in claim 14, wherein a velocity of the object transport unit depends upon a degree of deflection of the virtual operating element.

17. The computer-implemented method as claimed in claim 14, further comprising:
 automatically returning the virtual operating element to the starting position after being deflected upon the virtual operating element being no longer touched.

18. An examination system, comprising:
 an examination unit including an examination region;
 an object transport unit configured to transport an object to be examined into and/or out of the examination region; and
 a touch-sensitive screen configured to control a function and/or to visualize a state of the examination unit,
 wherein the touch-sensitive screen comprises a virtual operating element that is able to be manually displaced via a deflection of the virtual operating element in which the virtual operating element is physically moved from a starting position to a deflected position that is different than the starting position,
 wherein the object transport unit is configured to be moved toward or away from the examination region in accordance with the displacement of the virtual operating element, and
 wherein a velocity of the object transport unit depends upon a quadratic or exponential function of a degree of the deflection of the virtual operating element.

* * * * *